(12) United States Patent
Yoneda et al.

(10) Patent No.: US 7,767,077 B2
(45) Date of Patent: Aug. 3, 2010

(54) MEMBRANE FILTRATION SYSTEM

(75) Inventors: Tsuyoshi Yoneda, Matsuyama (JP); Atsuyuki Manabe, Matsuyama (JP)

(73) Assignee: Miura Co., Ltd., Matsuyama-shi (JP)

(*) Notice: Subject to any disclaimer, the term of this patent is extended or adjusted under 35 U.S.C. 154(b) by 61 days.

(21) Appl. No.: 11/806,638

(22) Filed: Jun. 1, 2007

(65) Prior Publication Data

US 2007/0295650 A1 Dec. 27, 2007

(30) Foreign Application Priority Data

Jun. 21, 2006 (JP) .............................. 2006-170872

(51) Int. Cl.
*B01D 63/00* (2006.01)
*C02F 1/44* (2006.01)
*C02F 9/00* (2006.01)

(52) U.S. Cl. ............... 210/97; 210/321.65; 210/195.2; 210/137

(58) Field of Classification Search ................ None
See application file for complete search history.

(56) References Cited

U.S. PATENT DOCUMENTS 5,520,816 A * 5/1996 Kuepper ............ 210/649
5,925,240 A * 7/1999 Wilkins et al. ............ 210/88
2004/0149637 A1* 8/2004 Valbjoern et al. ............ 210/137
2006/0081542 A1* 4/2006 Pulis et al. ................. 210/748

FOREIGN PATENT DOCUMENTS

| DE | 4331102 A1 * | 3/1995 |
| DE | 19520912 A1 * | 12/1996 |
| JP | 05-220480 A | 8/1993 |
| JP | 2005-279459 A | 10/2005 |
| JP | 2006-305499 A | 9/2006 |

* cited by examiner

*Primary Examiner*—Duane Smith
*Assistant Examiner*—Madeline Gonzalez
(74) *Attorney, Agent, or Firm*—Birch, Stewart, Kolasch & Birch, LLP (57) ABSTRACT

The present invention provides a membrane filtration system (1) including: a filtering membrane portion (3) for removing impurities in feed water; a drain line (16) for draining a part of concentrate from the filtering membrane portion (3) to an exterior of a system; a concentrate return line (17) for returning a remainder of the concentrate from the filtering membrane portion (3) to an upstream side of the filtering membrane portion (3); a return flow rate adjusting portion (28) for concentrate provided in the concentrate return line (17); and a control portion (30) controlling the return flow rate adjusting portion (28) based on a drain flow rate of the concentrate or a flow rate of product water from the filtering membrane portion (3). With this construction, it is possible to suppress wasteful power consumption in a feed pump (7) for feeding water to the filtering membrane portion (3) and to prevent clogging in the filtering membrane in the filtering membrane portion (3).

2 Claims, 7 Drawing Sheets

MEMBRANE FILTRATION SYSTEM

BACKGROUND OF THE INVENTION

1. Field of the Invention

The present invention relates to a membrane filtration system which is equipped with a filtering membrane portion for removing impurities in feed water and which returns a part of concentrate from the filtering membrane portion to an upstream side of the filtering membrane portion and discharges a remainder of the concentrate.

2. Description of the Related Art

As disclosed in JP 05-220480 A, as a water treatment system for feed water to an apparatus, a membrane filtration system is available which has a filtering membrane portion for filtering impurities contained in feed water, such as dissolved salts. In this membrane filtration system, feed water from a feed pump flows into the filtering membrane portion, and impurities contained in the feed water are filtered out. Then, permeate flowing out of the filtering membrane portion is supplied to the apparatus.

Apart from the permeate, concentrate flows out of the filtering membrane portion. As an example of the membrane filtration system, there exists a cross flow filtration type membrane filtration system which discharges only a part of the concentrate, and returns the remainder to the upstream side of the feed pump through a concentrate return line. In this membrane filtration system, in order to prevent fouling, that is, deposition on or adhesion to the membrane surface of suspended substances, colloids, organic matter, etc. in the water, operation is conducted so as to secure a predetermined flow velocity at the surface of the filtering membrane. For this purpose, the feeding flow rate of the feed pump is set such that the flow rate of the concentrate from the filtering membrane portion is of a fixed value or more with respect to the permeate flow rate, that is, the flow rate of the product water. However, when the concentrate flow rate increases to a degree more than necessary with respect to the flow rate of the product water, the feeding flow rate of the feed pump also increases, resulting in an increase in power consumption. In view of this, the concentrate flow rate is set so as to be of a predetermined proportion with respect to the flow rate of the product water so that no fouling may be generated and no wasteful power consumption may occur in the feed pump.

In this connection, the present applicant has proposed, in JP 2006-305499 A, a membrane filtration system operating method in which, in order to prevent clogging in the filtering membrane in the filtering membrane portion and to prevent discharge of concentrate in an amount more than necessary, the discharge flow rate of the concentrate is adjusted based on the temperature of one of the feed water to the filtering membrane portion, the permeate from the filtering membrane portion, and the concentrate from the filtering membrane portion, or on the quality of the feed water to the filtering membrane portion. However, if, upon an increase in the discharge flow rate of the concentrate, the return flow rate of the concentrate remains the same, the flow rate obtained by combining the discharge flow rate and the return flow rate, that is, the concentrate flow rate, becomes higher than the set value. As a result, the concentrate flow rate becomes higher than necessary as compared with the flow rate of the product water, and the feeding flow rate of the feed pump becomes higher than necessary, resulting in a wasteful power consumption. On the other hand, if, upon a reduction in the discharge flow rate of the concentrate, the return flow rate of the concentrate remains the same, the concentrate flow rate becomes lower than the set value. As a result, as compared with the flow rate of the product water, the flow rate of the concentrate is reduced, and the flow velocity at the surface of the filtering membrane decreases, so there is a fear of generation of clogging in the filtering membrane due to fouling.

Apart from this, the present applicant has proposed, in JP 2005-279459 A, a membrane filtration system operating method in which, in order to efficiently effect the filtration of impurities and the degassing of dissolved gas in correspondence with a change in the temperature of the feed water, the flow rate of the product water from the filtering membrane portion is adjusted based on the temperature of the feed water. However, if, upon a reduction in the flow rate of the product water, the return flow rate of the concentrate remains the same, the flow rate of the concentrate becomes higher than necessary with respect to the flow rate of the product water, and the feeding flow rate of the feed pump becomes higher than necessary, resulting in a wasteful power consumption. On the other hand, if, upon an increase in the flow rate of the product water, the return flow rate of the concentrate remains the same, the concentrate flow rate is reduced with respect to the flow rate of the product water, and the flow velocity at the surface of the filtering membrane decreases. As a result, there is a fear of generation of clogging in the filtering membrane due to fouling.

SUMMARY OF THE INVENTION

It is an object of the present invention to suppress wasteful power consumption in the feed pump for feeding water to the filtering membrane portion and to prevent clogging in the filtering membrane in the filtering membrane portion.

To solve the above-mentioned problems, according to a first aspect of the present invention, there is provided a membrane filtration system including: a filtering membrane portion for removing impurities in feed water; a drain line for draining a part of concentrate from the filtering membrane portion to an exterior of a system; a concentrate return line for returning a remainder of the concentrate from the filtering membrane portion to an upstream side of the filtering membrane portion; a return flow rate adjusting portion for concentrate provided in the concentrate return line; and a control portion controlling the return flow rate adjusting portion based on a drain flow rate of the concentrate from the filtering membrane portion.

According to a second aspect of the present invention, there is provided a membrane filtration system including: a filtering membrane portion for removing impurities in feed water; a drain line for draining a part of concentrate from the filtering membrane portion to an exterior of a system; a concentrate return line for returning a remainder of the concentrate from the filtering membrane portion to an upstream side of the filtering membrane portion; a return flow rate adjusting portion for concentrate provided in the concentrate return line; and a control portion controlling the return flow rate adjusting portion based on a flow rate of product water from the filtering membrane portion.

According to the first aspect of the invention, if the discharge flow rate of the concentrate from the filtering membrane portion increases or decreases, the return flow rate adjusting portion adjusts the return flow rate of the concentrate to the upstream side of the filtering membrane portion in correspondence therewith. In this way, the flow rate of the concentrate from the filtering membrane portion is maintained at the set value, thereby making it possible to maintain the proportion of the concentrate flow rate with respect to the flow rate of the product water. As a result, it is possible to prevent a wasteful power consumption in the feed pump for feeding water to the filtering membrane portion, and possible to maintain a fixed flow velocity at the surface of the filtering membrane, thereby preventing clogging in the filtering membrane due to fouling.

According to the second aspect of the invention, if the flow rate of the product water from the filtering membrane portion increases or decreases, the return flow rate adjusting portion adjusts the return flow rate of the concentrate to the upstream side of the filtering membrane portion in correspondence therewith. In this way, the proportion of the concentrate flow rate with respect to the flow rate of the product water can be maintained. As a result, it is possible to prevent a wasteful power consumption in the feed pump for feeding water to the filtering membrane portion, and possible to maintain a fixed flow velocity at the surface of the filtering membrane, thereby preventing clogging in the filtering membrane due to fouling.

DESCRIPTION OF THE PREFERRED EMBODIMENTS

Next, embodiments of the present invention will be described in detail with reference to the drawings.

First Embodiment

Figure 1:
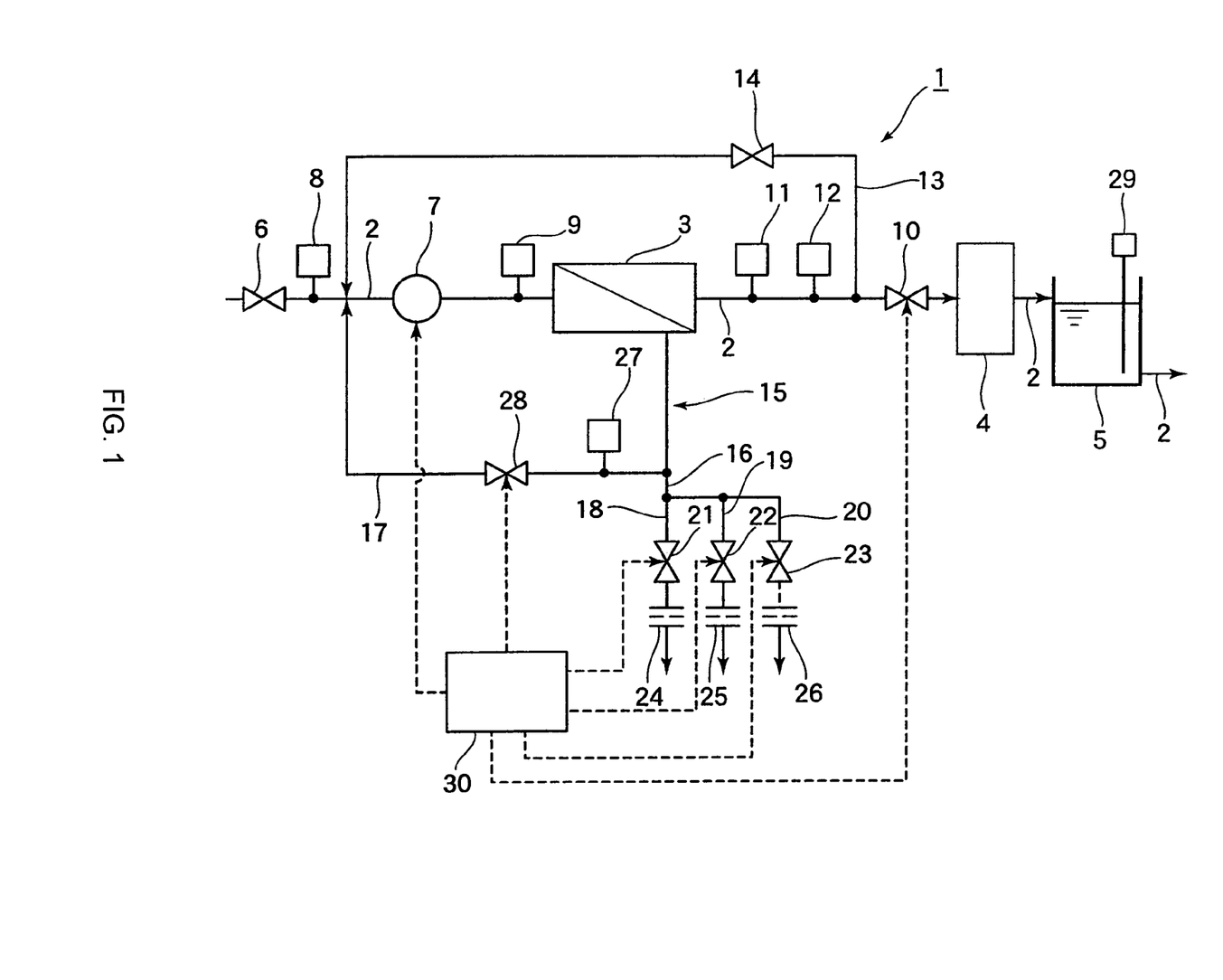
FIG. 1 is a schematic explanatory view illustrating the construction of a membrane filtration system according to a first embodiment of the present invention.

First, a first embodiment of the present invention will be described. In FIG. 1, a membrane filtration system 1 conducts treatment on raw water supplied from a raw water tank (not shown) storing raw water from a water source, such as city water, industrial water, or ground water, and this water is fed to an apparatus (not shown) such as a boiler, as feed water. The membrane filtration system 1 is equipped with a water supply line 2 for supplying water to the apparatus, and a filtering membrane portion 3 and a degassing membrane portion 4 which are connected to the water supply line 2, in the stated order from the upstream side. The product water that has passed through the filtering membrane portion 3 and the degassing membrane portion 4 is stored in a product water tank 5 connected to the water supply line 2.

The water supply line 2 has a first valve 6 and a feed pump 7 on the upstream side of the filtering membrane portion 3. The first valve 6 and the feed pump 7 are provided in the stated order from the upstream side. Further, a water quality sensor 8 is provided in the portion of the water supply line 2 between the first valve 6 and the feed pump 7. Still further, a pressure sensor 9 is provided in the portion of the water supply line 2 between the feed pump 7 and the filtering membrane portion 3.

The first valve 6 is a pressure reducing valve performing adjustment such that the water pressure in the portion of the water supply line 2 connected to a permeate return line 13 described below is not higher than a fixed pressure.

The water quality sensor 8 is adapted to detect the quality of the feed water on the upstream side of the filtering membrane portion 3 and to output a water quality detection signal to a control portion 30 described below. As the water quality sensor 8, there is used, for example, a conductivity sensor for measuring the conductivity of the feed water, a hardness sensor for measuring the concentration of hardness components contained in the feed water, a silica sensor for measuring the concentration of silica contained in the feed water, or a turbidity sensor for measuring the concentration of suspended matter contained in the feed water.

The pressure sensor 9 is adapted to detect the pressure of the feed water on the upstream side of the filtering membrane portion 3, and to output a pressure detection signal to the control portion 30. Here, it is also possible to provide, in addition to the pressure sensor 9, a pressure sensor (not shown) in a concentrate line 15 described below in order to detect the pressure of the concentrate from the filtering membrane portion 3. On the basis of the detection values of those pressure sensors, the control portion 30 obtains the average pressure [(pressure of the feed water on the upstream side of the filtering membrane portion 3+pressure of the concentrate)/2], and this value may be utilized in back-up control described below. Further, apart from the pressure sensor 9 and the pressure sensor provided in the concentrate line 15, it is also possible to provide a pressure sensor (not shown) in the portion of the water supply line 2 on the downstream side of the filtering membrane portion 3 in order to detect the pressure of the permeate from the filtering membrane portion 3. Further, the control portion 30 may subtract the pressure of the permeate from the above-mentioned average pressure to obtain the effective pressure of the filtering membrane in the filtering membrane portion 3 [{(pressure of the feed water on the upstream side of the filtering membrane portion 3+pressure of the concentrate)/2}−the pressure of the permeate], and this value may be utilized in the back-up control. Further, it is also possible to provide, in addition to the pressure sensor 9, a pressure sensor (not shown) in the portion of the water supply line 2 on the downstream side of the filtering membrane portion 3 in order to detect the pressure of the permeate from the filtering membrane portion 3. Further, the control portion 30 may subtract the pressure of the permeate from the pressure of the feed water on the upstream side of the filtering membrane portion 3 to obtain the effective pressure of the filtering membrane [pressure of the feed water on the upstream side of the filtering membrane portion 3−pressure of the permeate], and this value may be utilized in the back-up control.

A second valve 10 is provided in the portion of the water supply line 2 between the filtering membrane portion 3 and the degassing membrane portion 4. Further, in the portion of the water supply line 2 between the second valve 10 and the filtering membrane portion 3, there are provided a first flow rate sensor 11 and a temperature sensor 12 in the stated order from the upstream side.

The second valve 10 is an electromagnetic valve or a motor operated valve. The second valve 10 is controlled by the control portion 30.

The first flow rate sensor 11 is adapted to detect the flow rate of the permeate from the filtering membrane portion 3, that is, the flow rate of the product water, and to output a flow rate detection signal to the control portion 30. Further, the flow rate detection signal from the first flow rate sensor 11 is used in producing a command signal to be transmitted to an inverter 31 described below.

The temperature sensor 12 detects the temperature of the feed water on the downstream side of the filtering membrane portion 3 and outputs a temperature detection signal to the control portion 30. Here, it should be noted that, although not shown, the temperature sensor 12 may be provided either on the upstream side of the filtering membrane portion 3 or in the concentrate line 15. In this embodiment, the temperature sensor 12 performs an important function of effecting back-up in place of the first flow rate sensor 11 when there is some abnormality in the first flow rate sensor 11 (as described in detail below).

The portion of the water supply line 2 between the filtering membrane portion 3 and the second valve 10 and the portion of the water supply line 2 between the first valve 6 and the filtering membrane portion 3 are connected to each other through the permeate return line 13. In this embodiment, the permeate return line 13 is connected to the portion of the water supply line 2 between the temperature sensor 12 and the second valve 10 and to the portion of the water supply line 2 between the water quality sensor 8 and the feed pump 7. The permeate return line 13 is provided with a third valve 14. In this embodiment, a relief valve is used as the third valve 14.

The filtering membrane portion 3 is provided with a reverse osmosis membrane. The reverse osmosis membrane is a synthetic polymer membrane such as polyamide-based one or polyether-based one, that the pore size is 2 nm or under; it is a separation membrane that is capable of removing dissolved salts from aqueous solution. Usually, the reverse osmosis membrane is formed as a membrane element. The membrane element may assume the form of a spiral wound type element, a hollow fiber type element, a flat sheet type element, etc. For example, when the apparatus is a boiler, the reverse osmosis membrane functions as a separation membrane which removes corrosion acceleration components (e.g., sulfate ions and chloride ions) for a heat transfer tube. Further, the reverse osmosis membrane removes alkali components (e.g., bicarbonates and carbonates) producing hydroxides to raise the pH of the boiler water and suppress corrosion of the heat transfer tube.

The reverse osmosis membrane, that the salt rejection is approximately 70% or under, is called a nanofiltration membrane. The nanofiltration membrane functions as a separation membrane which removes corrosion acceleration components (e.g., sulfate ions and chloride ions) for the heat transfer tube. On the other hand, many parts of corrosion suppression components (e.g., silica) for the heat transfer tube pass through the nanofiltration membrane.

The feed water from the feed pump 7 flows into the filtering membrane portion 3. The feed water having flowed into the filtering membrane portion 3 is filtered by the reverse osmosis membrane, and flows out as permeate from the filtering membrane portion 3 to the water supply line 2.

Apart from permeate, concentrate also flows out of the filtering membrane portion 3. This concentrate flows out into the concentrate line 15 connected to the filtering membrane portion 3.

The concentrate line 15 branches off into a drain line 16 and a concentrate return line 17. The concentrate return line 17 is connected to the portion of the water supply line 2 on the upstream side of the feed pump 7 (in this embodiment, between the water quality sensor 8 and the feed pump 7). A part of the concentrate having flowed out of the filtering membrane portion 3 is discharge to the exterior of the system from the drain line 16, and the remainder is returned to the upstream side of the feed pump 7 through the concentrate return line 17.

The drain line 16 is branched off into a first drain line 18, a second drain line 19, and a third drain line 20. The drain lines 18, 19, and 20 are provided with a first drain valve 21, a second drain valve 22, and a third drain valve 23, respectively. Further, the drain lines 18, 19, and 20 are provided with a first constant flow rate valve 24, a second constant flow rate valve 25, and a third constant flow rate valve 26, respectively, that are on the downstream side of the drain valves 21, 22, and 23, respectively.

The constant flow rate valves 24, 25, and 26 are set to different flow rate values from one another. In other words, the drain flow rates from the drain lines 18, 19, and 20 are set to different amounts from one another. As a result, an apparatus operating portion (not shown) is operated to set the opening/closing states of the drain valves 21, 22, and 23, whereby the drain flow rate of concentrate to the exterior of the system can be easily adjusted stepwise.

The concentrate return line 17 is provided with a second flow rate sensor 27. Further, a proportional control valve 28 serving as a return flow rate adjusting portion is provided in the portion of the concentrate return line 17 on the downstream side of the second flow rate sensor 27.

The degassing membrane portion 4 is provided with a gas separation membrane module (not shown) equipped with a large number of gas separation membranes, and a water seal vacuum pump (not shown) adapted to vacuum-aspiration of the dissolved gas in the feed water, more specifically, the dissolved oxygen, through the gas separation membrane module.

The product water from the degassing membrane portion 4 is stored in the product water tank 5, from which it is supplied to the apparatus such as a boiler. The product water tank 5 is provided with a water level sensor 29. Based on the water level as detected by the water level sensor 29, the water level in the product water tank 5 is controlled (as described in detail below).

The feed pump 7, the second valve 10, the third valve 14, the drain valves 21, 22, and 23, and the proportional control valve 28 are controlled by the control portion 30, whereby various controls are performed on the membrane filtration system 1.

Figure 2:
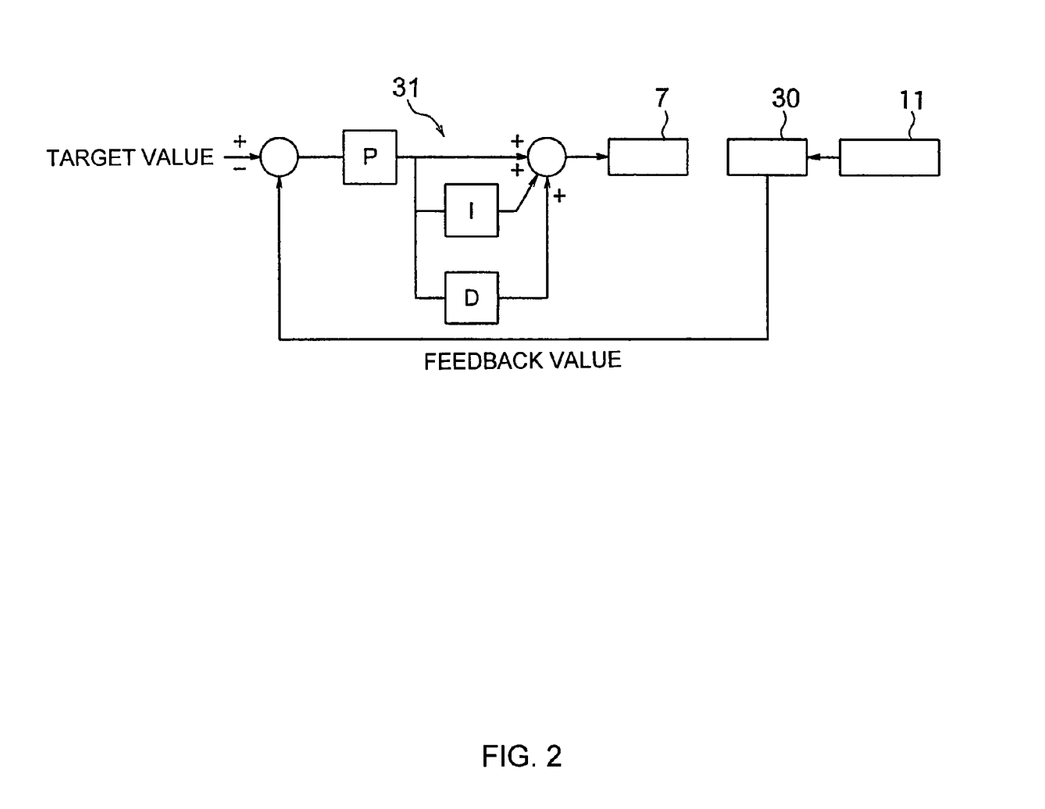
FIG. 2 is an explanatory view illustrating how a feed pump is controlled.

As shown in FIG. 2, upon receiving a flow rate detection signal from the first flow rate sensor 11, the control portion 30 outputs it to the inverter 31 as the flow rate signal. Further, the rotational speed of the feed pump 7 is controlled such that the flow rate of the product water becomes constant by a operation frequency output from the inverter 31 having received the flow rate signal (i.e., constant flow rate control, which will be described in detail below).

Figure 3:
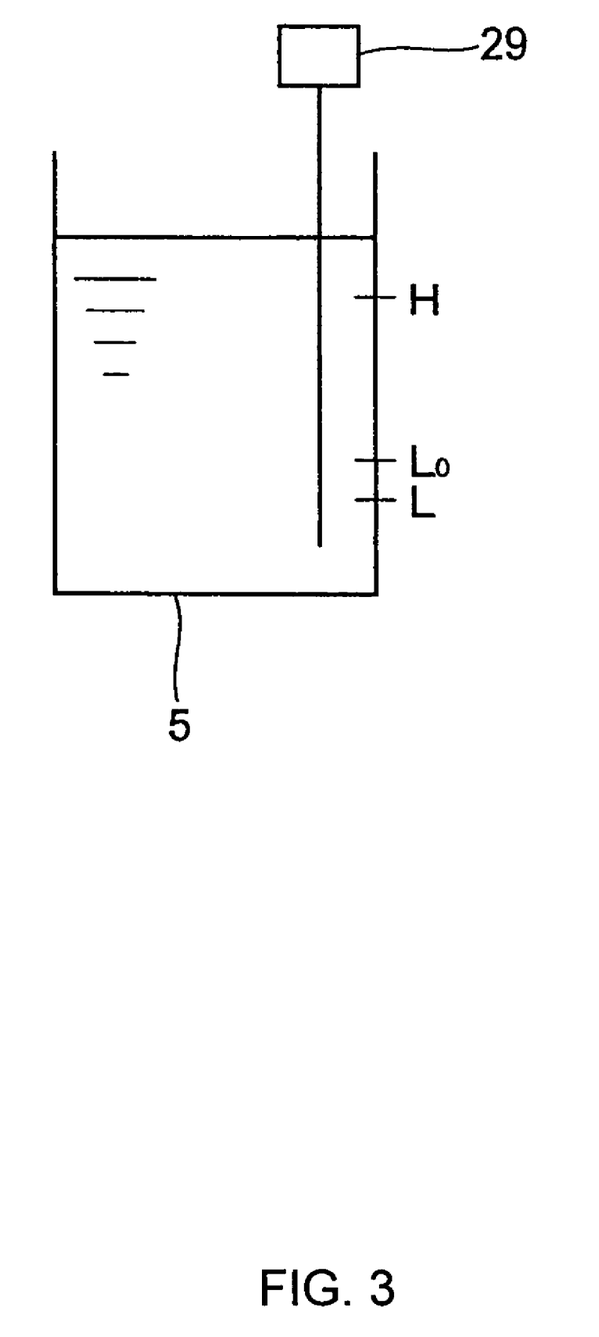
FIG. 3 is an enlarged view of a product water tank shown in FIG. 1.

Next, a method of operating the membrane filtration system 1 will be described. In the membrane filtration system 1, the control portion 30 starts or stops the operation of the feed pump 7 based on the water level of the product water tank 5. More specifically, as shown in FIG. 3, when the water level of the product water tank 5 attains a level L, the control portion 30 starts the operation of the feed pump 7. As a result, feed water is fed to the filtering membrane portion 3, and the feed water is first filtered by the reverse osmosis membrane (not shown) to remove the corrosion acceleration components. Further, from the filtering membrane portion 3, there flow out permeate from which the corrosion acceleration components have been removed and flow out concentrate which contains the corrosion acceleration components.

The permeate from the filtering membrane portion 3 is degassed at the degassing membrane portion 4, and is stored in the product water tank 5 as feed water to be fed to the apparatus (not shown). On the other hand, a part of the concentrate from the filtering membrane portion 3 is drained from the drain line 16, and the remainder is returned to the upstream side of the filtering membrane portion 3 through the concentrate return line 17.

During operation of the feed pump 7, the control portion 30 performs constant flow rate control based on the detection value from the first flow rate sensor 11. This constant flow rate control will be described. In this control, with the use of PID control functions of the inverter 31 (P-control: proportional control, I-control: integral control, D-control: differential control), the inverter frequency is controlled such that the permeate flow rate, that is, the flow rate of the product water, attains a target value. In the reverse osmosis membrane, the flow rate of the product water is greatly changed since the water viscosity and the membrane characteristics change due to fluctuations in water temperature. More specifically, the lower the water temperature, the lower the flow rate of the product water (approximately 2.5%/1° C.). As a result, when, for example, in winter, the water temperature is reduced to 10° C., the flow rate of the product water is approximately 60% of a rated flow rate of the product water set to a reference temperature (e.g., 25° C.), that is, the target flow rate of the product water. The flow rate of the product water is substantially proportional to the operating pressure, and it is possible to attain the target flow rate of the product water by raising the pressure according to the reduction in the flow rate of the product water due to the water temperature.

It might be possible to secure a fixed flow rate by previously setting the operation pressure high so that the target flow rate of the product water may be attained, and providing a constant flow rate valve on the side where permeate flows. However, except in winter, this method involves an excessive operation, resulting in a great loss in terms of energy. In view of this, in the above-mentioned membrane filtration system 1, the frequency is varied through PID control so that the set target flow rate of the product water may be attained, thereby always conducting an ideal operation to achieve energy saving.

The PID control will be described. As shown in FIG. 2, upon receiving a flow rate detection signal from the first flow rate sensor 11, the control portion 30 outputs a flow rate signal (e.g., an electric current value of 4 to 20 mA or a voltage value of 1 to 5 V) to the inverter 31. Using this flow rate signal as a feedback value, the inverter 31 compares it with the target value; when there is a deviation therebetween, the inverter 31 operates so as to reduce the deviation to zero (normal control).

When performing normal control, the control portion 30 calculates the flux of permeate passing the filtering membrane portion 3 for each predetermined time, and stores it. This flux is the flow rate of the product water passing the filtering membrane portion 3 per unit time and per unit pressure at a reference temperature (e.g., 25° C.). This flux is calculated as follows: the flow rate of the product water/(raw water pressure×temperature correction coefficient). Here, the flow rate of the product water is the detection value of the first flow rate sensor 11. The raw water pressure is the pressure of the feed water on the upstream side of the feed pump 7. In order to detect this raw water pressure, a pressure sensor (not shown) is provided in the portion of the water supply line 2 on the upstream side of the feed pump 7. The temperature correction coefficient is a value calculated from the detection value of the temperature sensor 12 and a predetermined coefficient.

Figure 4:
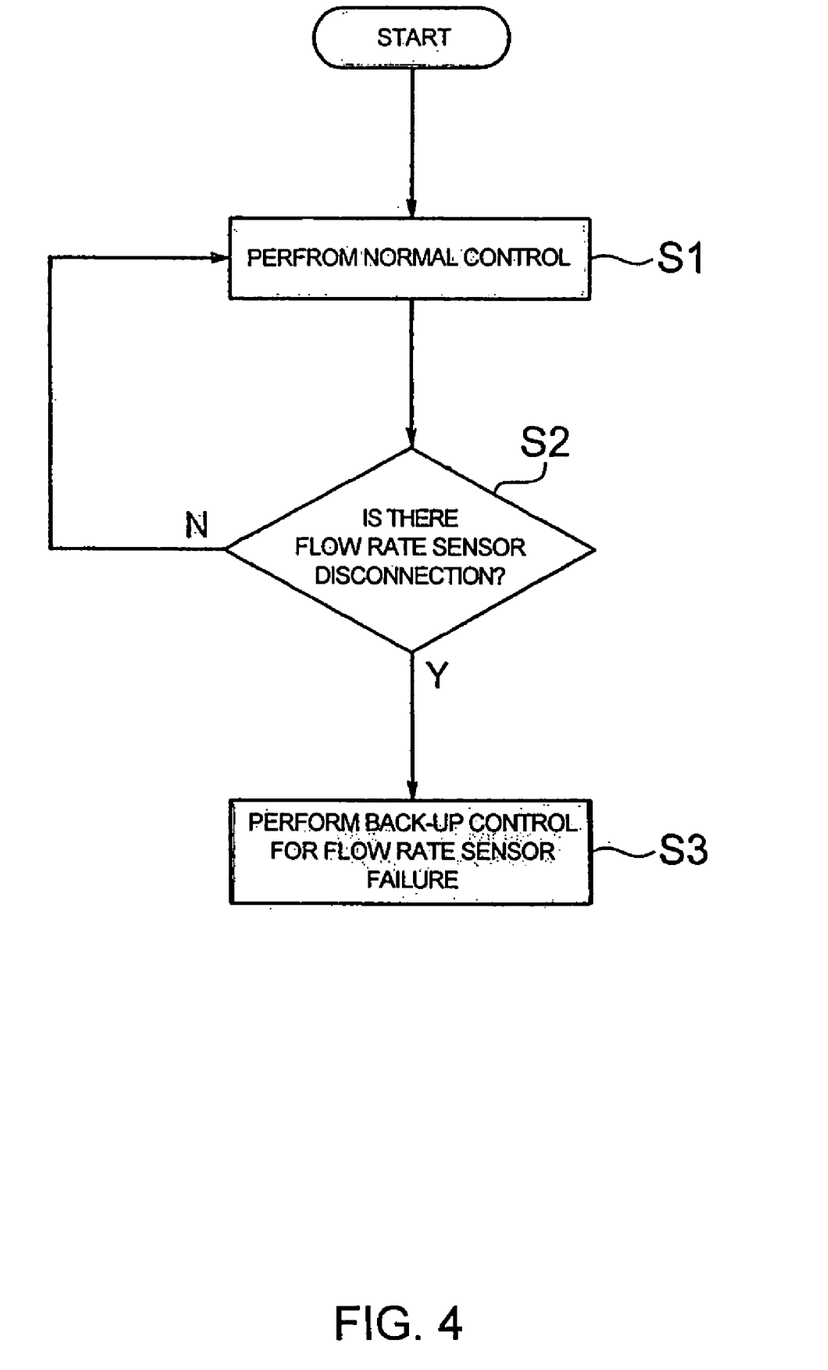
FIG. 4 is a flowchart illustrating a processing to be performed by a control portion.

In order to always perform an ideal operation, it is necessary for the control portion 30 to perform the following control. In FIG. 4, while performing the above-mentioned normal control (Step S1), the control portion 30 monitors the first flow rate sensor 11 for any abnormality (Step S2). In this monitoring, the control portion 30 makes a judgment as to whether there is any abnormality in the first flow rate sensor 11 according to the presence/absence of a signal from the first flow rate sensor 11. When there is a signal from the first flow rate sensor 11, the control portion 30 judges there is no abnormality such as disconnection (i.e., the answer in Step S2 is N), and continues the normal control. On the other hand, in a case where arrival of a signal from the first flow rate sensor 11 has ceased, the control portion 30 judges that there is abnormality such as disconnection (i.e., the answer in Step S2 is Y), and the procedure advances to Step S3. In Step S3, there is performed a back-up control for abnormality such as failure of the first flow rate sensor 11.

Here, when, in Step S2, the control portion 30 judges that there is abnormality such as disconnection, the control portion 30 may inform of the abnormality by using an informing device (not shown). By thus informing of the abnormality, it is possible to expedite the restoring operation.

Figure 5:
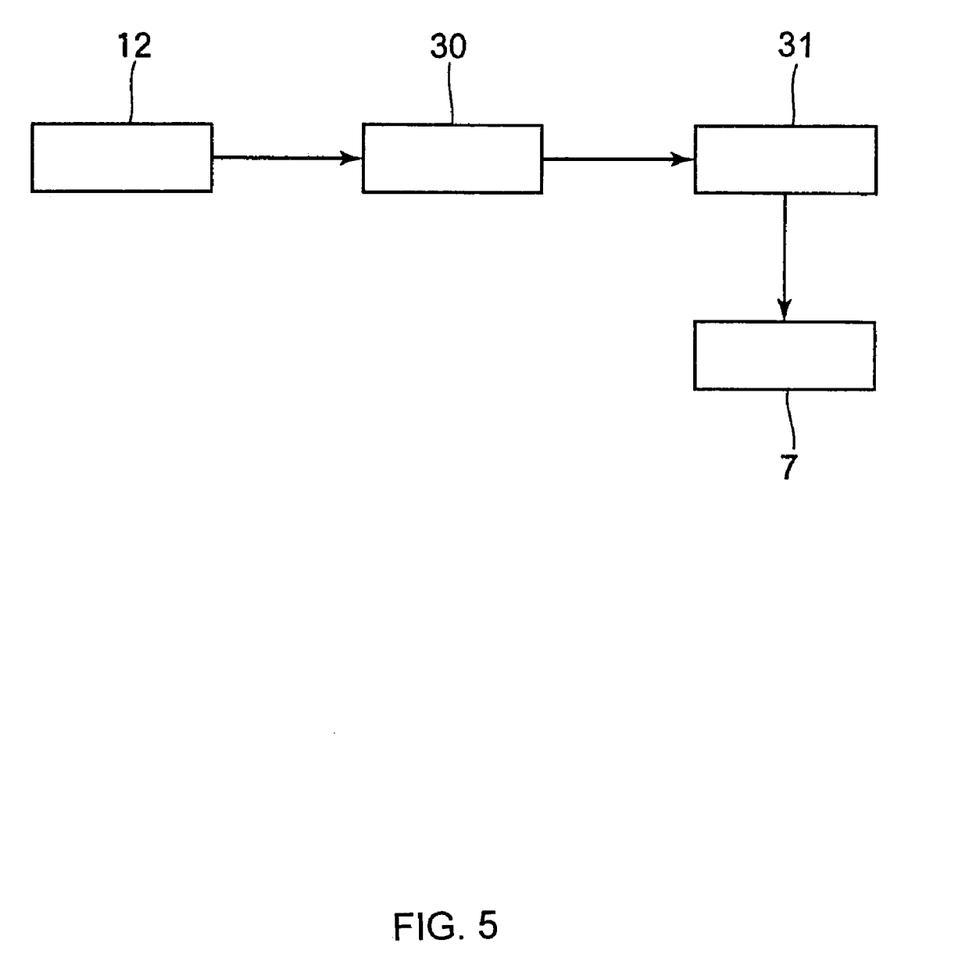
FIG. 5 is an explanatory view illustrating how the feed pump is controlled in back-up control.
Figure 6:
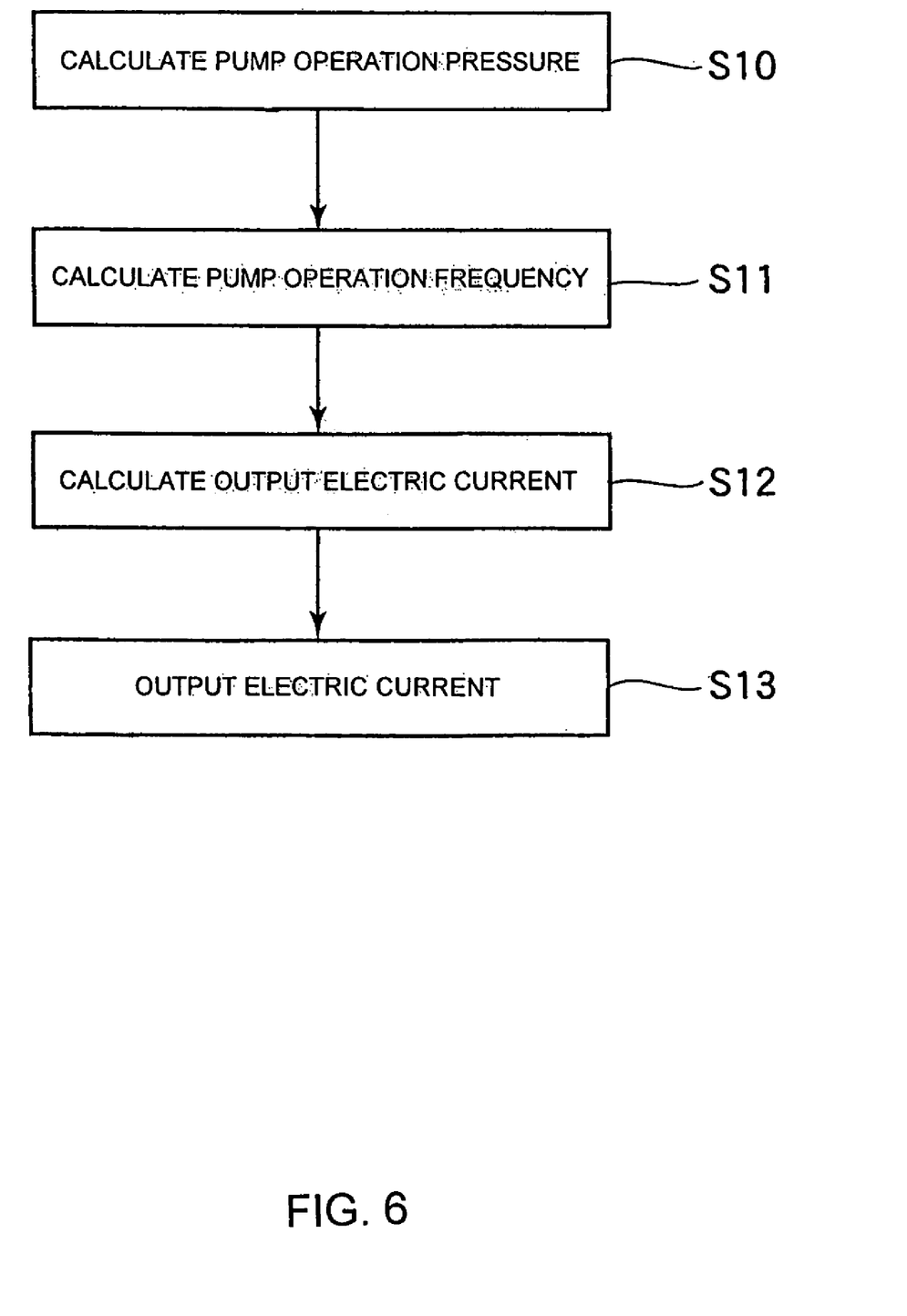
FIG. 6 is a flowchart illustrating a processing to be performed by the control portion in back-up control.

An example of the back-up control in Step S3 will be described specifically with reference to FIGS. 5 and 6.

When, in the back-up control of Step S3, a temperature detection signal from the temperature sensor 12 is input to the control portion 30, the control portion 30 processes the temperature detection signal, and outputs a command signal to the inverter 31. The inverter 31 controls the feed pump 7 based on the command signal.

The processing of the temperature detection signal in the control portion 30 will be described specifically with reference to FIG. 6. First, the control portion 30 calculates the operation pressure of the feed pump 7 (hereinafter referred to as "pump operation pressure") based on the mean value of flux calculated and stored during normal operation, that is, the average flux, and on the detection value of the temperature sensor 12 at the time of back-up control (Step S10). Next, the control portion 30 calculates the operation frequency of the feed pump 7 (hereinafter referred to as "pump operation frequency") based on this pump operation pressure (Step S11), and further, calculates the electric current value based on the pump operation frequency (Step S12). Further, the control portion 30 outputs an electric current value corresponding to this pump operation frequency to the inverter 31 as a command signal (Step S13). As a result, the water supply pump 7 is operated so as to attain the target flow rate of the product water.

More specifically, the pump operation pressure in Step S10 is calculated as follows: {target flow rate of the product water/(average flux×temperature correction coefficient)}−raw water pressure. Here, the temperature correction coefficient is a value calculated from the detection value of the temperature sensor 12 at the time of back-up control and a predetermined coefficient. The raw water pressure is the detection value at the time of back-up control of the pressure sensor (not shown) provided in the portion of the water supply line 2 on the upstream side of the feed pump 7.

From the above-mentioned value: target flow rate of the product water/(average flux×temperature correction coefficient), it is possible to calculate the effective pressure of the reverse osmosis membrane in the filtering membrane portion 3. As described above, the effective pressure of the filtering membrane portion 3 can be calculated from the respective detection values of the pressure sensor 9, the pressure sensor (not shown) for detecting the pressure of the concentrate from the filtering membrane portion 3, and the pressure sensor (not shown) for detecting the pressure of the permeate from the filtering membrane portion 3. The effective pressure of the reverse osmosis membrane can also be calculated based on the pressure sensor 9 and the pressure sensor for detecting the pressure of the permeate from the filtering membrane portion 3. As a result, in the formula for calculating the pump operation pressure, it is possible to use, instead of the value: target flow rate of the product water/(average flux×temperature correction coefficient), the effective pressure of the reverse osmosis membrane calculated from the detection values of the pressure sensors mentioned above.

The calculation of the pump operation frequency in Step S11 will be described specifically. Assuming that the pump operation pressure calculated in Step S10 is P, the pump operation frequency can be calculated as follows: $A \times P^2 + B \times P + C$, where A, B, and C are predetermined coefficients.

The calculation of the electric current value in Step S12 will be described specifically. Assuming that the pump operation frequency calculated in Step S11 is F, this electric current value is calculated as follows: $(F/X) \times Y + Z$, where X, Y, and Z are predetermined coefficients.

In the membrane filtration system 1 of this embodiment, the back-up control is not restricted to the above-mentioned example. For example, based on the detection value of the temperature sensor 12 (or based on detection value from the temperature sensor 12 and the detection value of the pressure sensor 9), the control portion 30 may output a predetermined electric current value corresponding, for example, to the temperature (or electric current value corresponding to the temperature and pressure) to the inverter 31 as a command signal.

Here, in determining an electric current value corresponding to the temperature and pressure, it is also possible to use, instead of the detection value of the pressure sensor 9, the mean value of the detection value of the pressure sensor 9 and the detection value of the pressure sensor for detecting the pressure of the concentrate from the filtering membrane portion 3.

It is known, from study results obtained by the present applicant, that the correction coefficient of the flow rate of the product water with respect to the water temperature is approximately 2.5%/1° C. when a specific reverse osmosis membrane is used. As a result, when the pump operation pressure at, for example, 25° C., is set to a reference operation pressure, the flow rate of the product water is reduced by approximately 25% when the water temperature is reduced to 15° C. In this case, to secure a fixed flow rate, the pump operation pressure is made higher. That is, 1/0.75=1.33 times the pressure is simply applied, and an electric current value leading to such a pump operation pressure is previously determined.

In this way, in the membrane filtration system 1, the inverter frequency is controlled such that the flow rate of the product water attains the target value by using the PID control function of the inverter 31, so it is possible to contribute to energy saving in the operation.

Here, while in the membrane filtration system 1 of this embodiment a constant flow rate control using the PID control function of the inverter 31 is normally conducted, and a constant flow rate control using the temperature sensor 12 and/or the pressure sensor 9 is conducted as back-up control, this should not be construed restrictively. That is, it is also possible for the membrane filtration system 1 to normally conduct a constant flow rate control using the temperature sensor 12 and/or the pressure sensor 9, and to conduct, as a back-up control, a constant flow rate control using the PID control function of the inverter 31. In this case, the control portion 30 monitors the temperature sensor 12 and/or the pressure sensor 9 for any abnormality. When there is some abnormality in the temperature sensor 12 or the pressure sensor 9, a constant flow rate control using the PID control function of the inverter 31 is conducted as a back-up control based on the flow rate detection signal from the first flow rate sensor 11.

The flow rate of the concentrate from the filtering membrane portion 3 is set to a value leading to a predetermined proportion with respect to the flow rate of the product water so that no fouling may be generated around the surface of the reverse osmosis membrane and that no wasteful power consumption may occur in the feed pump 7.

The control portion 30 performs opening/closing control on the drain valves 21, 22, and 23 to adjust the drain flow rate of the concentrate. For the purpose, for example, of preventing clogging in the reverse osmosis membrane and preventing draining of concentrate in an amount larger than necessary, the control portion 30 adjusts the drain flow rate of the concentrate based on the detection value of the temperature sensor 12, that is, the temperature of the feed water from the filtering membrane portion 3. More specifically, when the detection value of the temperature sensor 12 is changed, the control portion 30 increases or decreases the drain flow rate of the concentrate within a range in which no concentration in excess of the solubility of the various impurities (e.g., calcium carbonate and silica) occurs in the feed water at the temperature.

Here, the control portion 30 may adjust the drain flow rate of the concentrate based on the temperature of either the feed water to the filtering membrane portion 3 or the concentrate from the filtering membrane portion 3.

Further, the control portion 30 may adjust the drain flow rate of the concentrate based on the detection value of the water quality sensor 8. More specifically, when the water quality sensor 8 detects an increase in the concentration, for example, of hardness components, silica, and suspended matter, the control portion 30 increases the drain flow rate of the concentrate so as not to generate clogging in the reverse osmosis membrane. Conversely, when the water quality sensor 8 detects a reduction in the concentration of the hardness components, silica, suspended matter, etc., clogging does not easily occur in the reverse osmosis membrane, so the control portion 30 reduces the drain flow rate of the concentrate.

The control portion 30 controls the proportional control valve 28 such that a return flow rate set according to the drain flow rate of the concentrate is attained. More specifically, when the drain flow rate of the concentrate increases, the control portion 30 reduces the opening of the proportional control valve 28, and reduces the return flow rate so as to maintain the concentrate flow rate at the set value. On the other hand, when the drain flow rate of the concentrate is reduced, the control portion 30 increases the opening of the proportional control valve 28, and increases the return flow rate so as to maintain the concentrate flow rate at the set value.

Here, when the water temperature of the feed water is changed, the control portion 30 changes the feeding flow rate of the feed pump 7 such that the flow rate of the product water becomes constant, so return flow rate set according to the drain flow rate of the concentrate is changed. In view of this, the control portion 30 adjusts, based on the detection valve of the second flow rate sensor 27, the opening of the proportional control valve 28 such that the return flow rate set according to the drain flow rate of the concentrate becomes constant.

In this way, according to the membrane filtration system 1, when the drain flow rate of the concentrate increases, the opening of the proportional control valve 28 is reduced, and the return flow rate decreases. As a result, it is possible to maintain the flow rate of the concentrate at the set value, and to maintain the proportion of the flow rate of the concentrate with respect to the flow rate of the product water, so it is possible to prevent a wasteful power consumption in the feed pump 7. When the drain flow rate of the concentrate decreases, the opening of the proportional control valve 28 increases, and the return flow rate increases. As a result, it is possible to maintain the flow rate of the concentrate at the set value, and to maintain the proportion of the flow rate of the concentrate with respect to the flow rate of the product water. Accordingly, the flow velocity at the surface of the reverse osmosis membrane is maintained, and it is possible to prevent clogging in the reverse osmosis membrane due to fouling.

In the membrane filtration system 1, when the water level of the product water tank 5 attains a level H, the control portion 30 stops the operation of the feed pump 7. When the operation of the feed pump 7 is stopped, in order to prevent clogging in the reverse osmosis membrane due to such phenomena as fouling and scaling, there is performed, at predetermined time intervals, a blow operation in which the concentrate generated in the filtering membrane portion 3 is drained through the drain line 16. In this case, in order to achieve a reduction in blowing time and a reduction in the drain flow rate of the resultant concentrate, the control portion 30 places the second valve 10 in the closed state.

When the second valve 10 is placed in the closed state, the water pressure in the portion of the water supply line 2 between the first valve 6 and the water supply pump 7, to which one end of the permeate return line 13 is connected, becomes lower than the water pressure in the portion of the water supply line 2 between the filtering membrane portion 3 and the second valve 10, to which the other end of the permeate return line 13 is connected. Then, due to the pressure difference, the third valve 14, which is a relief valve, is placed in the open state, and the permeate from the filtering membrane portion 3 flows through the permeate return line 13 and returns to the portion of the water supply line 2 between the first valve 6 and the water supply pump 7. As a result, the back pressure applied to the reverse osmosis membrane from the permeation side is reduced, so it is possible to prevent damage of the reverse osmosis membrane.

The valve opening pressure and the opening (flow rate) of the third valve 14, which is a relief valve, are set such that the permeate from the filtering membrane portion 3 is returned to the upstream side of the filtering membrane portion 3 by the permeate return line 13, making it possible to reduce the back pressure applied from the permeation side to the reverse osmosis membrane. Here, it is also possible to set the valve opening pressure and the opening of the third valve 14 according to the water temperature so that the back pressure applied to the reverse osmosis membrane may be reduced. For example, the higher the water temperature, the easier for the water to permeate through the reverse osmosis membrane, and the higher the back pressure applied to the reverse osmosis membrane. As a result, the higher the water temperature, the lower the valve opening pressure of the third valve 14 is set in order to facilitate the return of the permeate, and the larger the opening of the third valve 14 is set so that the flow rate may increase.

As needed, the permeate return line 13 may be provided with an orifice (not shown) on the downstream side of the third valve 14.

The water pressure between the first valve 6 and the feed pump 7 is constantly reduced to a fixed pressure by the first valve 6, so even if the feed water pressure fluctuates, the return flow rate of the permeate from the permeate return line 13 is always a fixed flowrate. As a result, it is possible to achieve, in a stable manner, a reduction in the back pressure applied from the permeation side to the reverse osmosis membrane.

Apart from the blow operation of the concentrate performed as described above, back pressure from the permeation side is applied to the reverse osmosis membrane also when the second valve 10 remains in the closed state due to failure or the like, so there is a fear of the reverse osmosis membrane suffering damage. Further, in the portion of the water supply line 2 between the degassing membrane portion 4 and the product water tank 5, there is provided a manual opening/closing valve (not shown), which is placed in the open state at the time of water supply to the product water tank 5, and in the closed state when water supply is stopped. When this manual opening/closing valve is left in the closed state due to failure to open it at the time of water supply, there is a fear of the reverse osmosis membrane suffering damage due to back pressure applied from the permeation side. Even in such a case, according to the membrane filtration system 1, it is possible to reduce the back pressure applied from the permeation side to the reverse osmosis membrane by returning the permeate from the filtering membrane portion 3 through the permeate return line 13. As a result, it is possible to prevent damage of the reverse osmosis membrane.

While in this embodiment the third valve 14 is a relief valve, this should not be construed restrictively; for example, it may also be a check valve, an electromagnetic valve, or a motor operated valve. The opening/closing control when the third valve 14 is an electromagnetic valve or a motor operated valve will be described. When the second valve 10 is in the open state, and no blowing of the concentrate is being conducted, the control portion 30 places the third valve 14 in the closed state. On the other hand, when the second valve 10 is in the closed state, and blowing of the concentrate is being conducted, the control portion 30 places the third valve 14 in the open state, returning the permeate from the filtering membrane portion 3 to the upstream side of the feed pump 7 through the permeate return line 13. Here, in order to detect the back pressure applied to the reverse osmosis membrane, a pressure sensor (not shown) may be provided, for example, in the portion of the water supply line 2 between the filtering membrane portion 3 and the second valve 10. In this case, when it is detected that a pressure not lower than a fixed level has been attained, the control portion 30 places the third valve 14 in the open state. As a result, it is possible to prevent damage of the reverse osmosis membrane more reliably.

In the membrane filtration system 1, at the time of stopping the operation, that is, when the operation of the feed pump 7 is stopped, no feed water pressure from the feed side is applied to the reverse osmosis membrane. As a result, osmosis occurs near the reverse osmosis membrane, and the impurity concentration on the permeation side increases. At the same time, the impurity concentration on the feed side decreases. When, in this state, the operation of the feed pump 7 is started, due to the increase in the impurity concentration on the permeation side, water whose impurity concentration is higher than normal is stored in the product water tank 5 as product water immediately after the operation start. Then, afterwards, due to the decrease in the impurity concentration on the feed side, water whose impurity concentration is lower than normal is stored in the product water tank 5 as product water. As a result, product water whose corrosion acceleration components concentration is higher than normal is first stored in the product water tank 5, and then product water whose corrosion suppression components concentration and alkali components concentration are lower than normal is stored therein. When such product water is fed to the boiler constituting the apparatus concerned, corrosion of the heat transfer tube is liable to occur. Further, in the membrane filtration system 1, in order to prevent storage of water whose impurity concentration is higher than normal in the product water tank 5 as product water, a permeate return operation is conducted prior to the operation start of the feed pump 7. Further, in the membrane filtration system 1, in order to prevent storage of water whose impurity concentration is lower than normal in the product water tank 5 as product water at the operation start of the feed pump 7, a water quality recovery operation is conducted after the operation start of the feed pump 7. The return operation and the water quality recovery operation will be described below.

In the membrane filtration system 1, when, during suspension of the water supply to the product water tank 5, it is detected by the water level sensor 29 that the water level in the product water tank 5 has been reduced to level $L_0$ (see FIG. 3), the return operation is started. In the return operation, the second valve 10 and the drain valves 21, 22, and 23 are placed in the closed state, and the permeate from the filtering membrane portion 3 is returned to the upstream side of the filtering membrane portion 3 through the permeate return line 13. In this embodiment, the control portion 30 places the second valve 10 in the closed state, and operates the feed pump 7. As a result, the water pressure on the upstream side of the third valve 14 becomes higher than the valve opening pressure thereof to place the third valve 14 in the open state. The permeate from the filtering membrane portion 3 flows through the permeate return line 13 to return to the portion of the water supply line 2 between the feed pump 7 and the first valve 6.

When the permeate from the filtering membrane portion 3 returns to the upstream side of the filtering membrane portion 3, the water pressure in the filtering membrane portion 3 becomes higher on the feed side than on the permeation side, and the feed water flows from the feed side to the permeation side. Further, the corrosion acceleration components is removed by the reverse osmosis membrane through reverse osmosis, so it is possible to prevent a deterioration in the quality of the permeate when the water supply to the product water tank 5 is started.

Here, the water pressure between the first valve 6 and the feed pump 7 is constantly reduced to a fixed water pressure by the first valve 6. As a result, even if the supply water pressure of the raw water fluctuates, the return flow rate of the permeate from the permeate return line 13 is always a fixed flow rate.

When performing the return operation, the control portion 30 may place the drain valves 21, 22, and 23 in the closed state; further, the control portion 30 may place one of the drain valves 21, 22, and 23 in the open state. When the control portion 30 places the drain valves 21, 22, and 23 in the closed state, it is possible to achieve water saving. On the other hand, when the control portion 30 places one of the drain valves 21, 22, and 23 in the open state, the impurity concentration of the concentrate from the filtering membrane portion 3 is reduced, thus making the quality of the permeate satisfactory.

When, during the return operation, the water level in the product water tank 5 achieves level L, the control portion 30 places the second valve 10 in the open state, and starts the operation of the feed pump 7, thus starting water supply to the product water tank 5. In this case, the water pressure on the upstream side of the third valve 14 becomes lower than the valve opening pressure thereof, and the third valve 14 is placed in the closed state, whereby the return operation is completed.

The length of the operation time of the return operation is set such that the corrosion acceleration components in the feed water is removed to a sufficient degree, making it possible to mitigate a deterioration in the quality of the permeate. Water level $L_0$, at which the return operation is started, is set such that such an operation time can be secured.

More specifically, the length of the operation time of the return operation is set based on the detection value of the water quality sensor 8 such that the corrosion acceleration components in the feed water can be removed to a sufficient degree to thereby mitigate the deterioration in the quality of the permeate (it is also possible to provide the water quality sensor 8 in the portion of the water supply line 2 on the downstream side of the filtering membrane portion 3 or in the concentrate line 15, using the detection value thereof). That is, the quality of the raw water (the impurity concentration in this case) differs depending upon the district, season, etc. As a result, when the detection value of the water quality sensor 8 increases, water level $L_0$ is set higher, and the operation time of the return operation is elongated, making it possible to remove the corrosion acceleration components in the feed water to a sufficient degree. On the other hand, when the detection value of the water quality sensor 8 decreases, due to the low impurity concentration on the permeation side near the reverse osmosis membrane, water level $L_0$ is accordingly set lower to shorten the operation time of the return operation.

Further, in order that the corrosion acceleration components in the feed water may be removed to a sufficient degree to make it possible to prevent a deterioration in the quality of the permeate, it is also possible to set the length of the operation time of the return operation based on the length of time during which the feeding of feed water to the filtering membrane portion 3 has been suspended. That is, the longer the time during which the feeding of feed water to the filtering membrane portion 3 has been suspended, the higher the impurity concentration on the permeation side near the reverse osmosis membrane. As a result, when the time during which the feeding of feed water to the filtering membrane portion 3 has been suspended is long, the water level $L_0$ is set higher, and the operation time of the return operation is elongated, removing the corrosion acceleration components in the feed water to a sufficient degree. On the other hand, when the time during which the feeding of feed water to the filtering membrane portion 3 has been suspended is short, the impurity concentration on the permeation side near the reverse osmosis membrane, so the water level $L_0$ is according set lower, and the operation time of the return operation is shortened.

That is, the operation time of the return operation is set as the requisite time for the water level in the product water tank 5 to reach the water level L from the water level $L_0$.

Further, in order that the corrosion acceleration components in the feed water may be removed to a sufficiently degree to prevent a deterioration in the quality of the permeate, the length of the operation time of the return operation may also be set based on the detection value of the water quality sensor 8 and the length of the time during which the feeding of feed water to the filtering membrane portion 3 has been suspended.

Here, depending upon the operating condition of the apparatus, such as the stopping of the apparatus after the start of the return operation, the requisite time for the water level in the product water tank 5 to reach the water level L from the water level $L_0$ can be longer than expected. In this case, even after the lapse of the operation time set as described above so as to remove the corrosion acceleration components in the feed water to a sufficient degree and to prevent a deterioration in the quality of the permeate, the water level in the product water tank 5 does not reach the water level L. As a result, even before the water level in the product water tank 5 reaches the water level L, it is possible, in a case where the set operation time has elapsed after the start of the return operation, for the control portion 30 to place the second valve 10 in the open state and to start the water supply to the product water tank 5, thus completing the return operation.

When the return operation is completed, and the water supply to the product water tank 5 is started, the water quality recovery operation is started. In the water quality recovery operation, the drain flow rate of the concentrate from the filtering membrane portion 3 is made lower than normal for a predetermined period of time after the start to thereby make the water recovery rate higher than normal. With this operation, the concentration of the feed water fed to the filtering membrane portion 3 is promoted, and the impurity concentration increases. As a result, the concentration of the corrosion suppression components in the permeate increases, and the amount of alkali components passed through the reverse osmosis membrane increases to undergo an increase in the concentration thereof, thereby recovering the quality of the permeate.

The drain flow rate of the concentrate during the water quality recovery operation and the length of the operation time are set such that the feed water fed to the filtering membrane portion 3 is concentrated within a range involving no excessive concentration, making it possible to recover the quality of the permeate to a predetermined quality.

More specifically, the drain flow rate of the concentrate during the water quality recovery operation and the length of the operation time are set based on the detection value of temperature sensor 12 so that the feed water fed to the filtering membrane portion 3 may be concentrated within a range involving no excessive concentration to make it possible to recover the quality of the permeate to a predetermined water quality (it is also possible to use the detection value of the temperature sensor 12 provided either in the portion of the water supply line 2 on the upstream side of the filtering membrane portion 3 or in the concentrate line 15). That is, the higher the water temperature, the higher the solubility of silica, which is the corrosion suppression components, and the lower the lower the water temperature. As a result, when the detection value of the temperature sensor 12 is high, the reduction amount of the drain flow rate of the concentrate during the water quality recovery operation increases to make the water recovery rate relatively high. On the other hand, when the detection value of the temperature sensor 12 is low, the drain flow rate of the concentrate during the water quality recovery operation decreases to make the water recovery rate lower than when the temperature is high. When the detection value of the temperature sensor 12 becomes higher, the operation time of the water quality recovery operation is shortened. On the other hand, when the detection value of temperature sensor 12 becomes lower, the operation time of the water quality recovery operation is elongated.

The drain flow rate of the concentrate during the water quality recovery operation and the length of the operation time may also be set based on the detection value of the water quality sensor 8 such that the feed water fed to the filtering membrane portion 3 is concentrated within a range involving no excessive concentration to recover the quality of the permeate to a predetermined water quality (it is also possible to provide the water quality sensor 8 in the portion of the water supply line 2 on the downstream side of the filtering membrane portion 3 or in the concentrate line 15 and to use the detection value thereof). That is, the quality of the raw water varies depending upon the district and season. As a result, when the detection value of the water quality sensor 8 decreases, the reduction amount of the drain flow rate of the concentrate during the water recovery operation is increased to make the water recovery rate relatively high. On the other hand, when the detection value of the water quality sensor 8 increases, the reduction amount of the drain flow rate of the concentrate during the water quality recovery operation is reduced to make the water recovery rate lower than when the detection value is low. Further, when the detection value of the water quality sensor 8 increases, the operation time of the water quality recovery operation is shortened. On the other hand, when the detection value of the water quality sensor 8 decreases, the operation time of the water quality recovery operation is elongated.

Further, the drain flow rate of the concentrate during the water quality recovery operation and the length of the operation time may be set based on the length of the time during which the feeding of feed water to the filtering membrane portion 3 has been suspended, such that the feed water fed to the filtering membrane portion 3 is concentrated within a range involving no excessive concentration, making it possible to recover the water quality of the permeate to a predetermined water quality. That is, the longer the time during which the feeding of feed water to the filtering membrane portion 3 has been suspended, the lower the impurity concentration on the feed side near the reverse osmosis membrane. As a result, when the time during which the water feeding to the filtering membrane portion 3 has been suspended is long, the reduction amount of the drain flow rate of the concentrate during the water quality recovery operation increases to make the water recovery rate relatively high. On the other hand, when the time during which the water feeding to the filtering membrane portion 3 has been suspended is short, the reduction amount of the drain flow rate of the concentrate during the water quality recovery operation is reduced to make the water recovery rate lower than when the water feeding suspension time is long. Further, when the time during which the water feeding to the filtering membrane portion 3 has been suspended is long, the operation time of the water quality recovery operation is elongated. On the other hand, when the time during which the water feeding to the filtering membrane portion 3 has been suspended is short, the operation time of the water quality recovery operation is shortened.

Further, the drain flow rate of the concentrate during the water quality recovery operation and the length of the operation time may also be set based on two or more of the following factors. The detection value of the temperature sensor 12, the detection value of the water quality sensor 8, and the length of the time during which the feeding of feed water to the filtering membrane portion 3 has been suspended, such that the feed water fed to the filtering membrane portion 3 is concentrated within a range involving no excessive concentration, making it possible to recover the quality of the permeate to a predetermined water quality.

When the drain amount of the concentrate is thus set, the control portion 30 opens or closes the drain valves 21, 22, and 23 such that the preset drain amount is attained.

Second Embodiment

Figure 7:
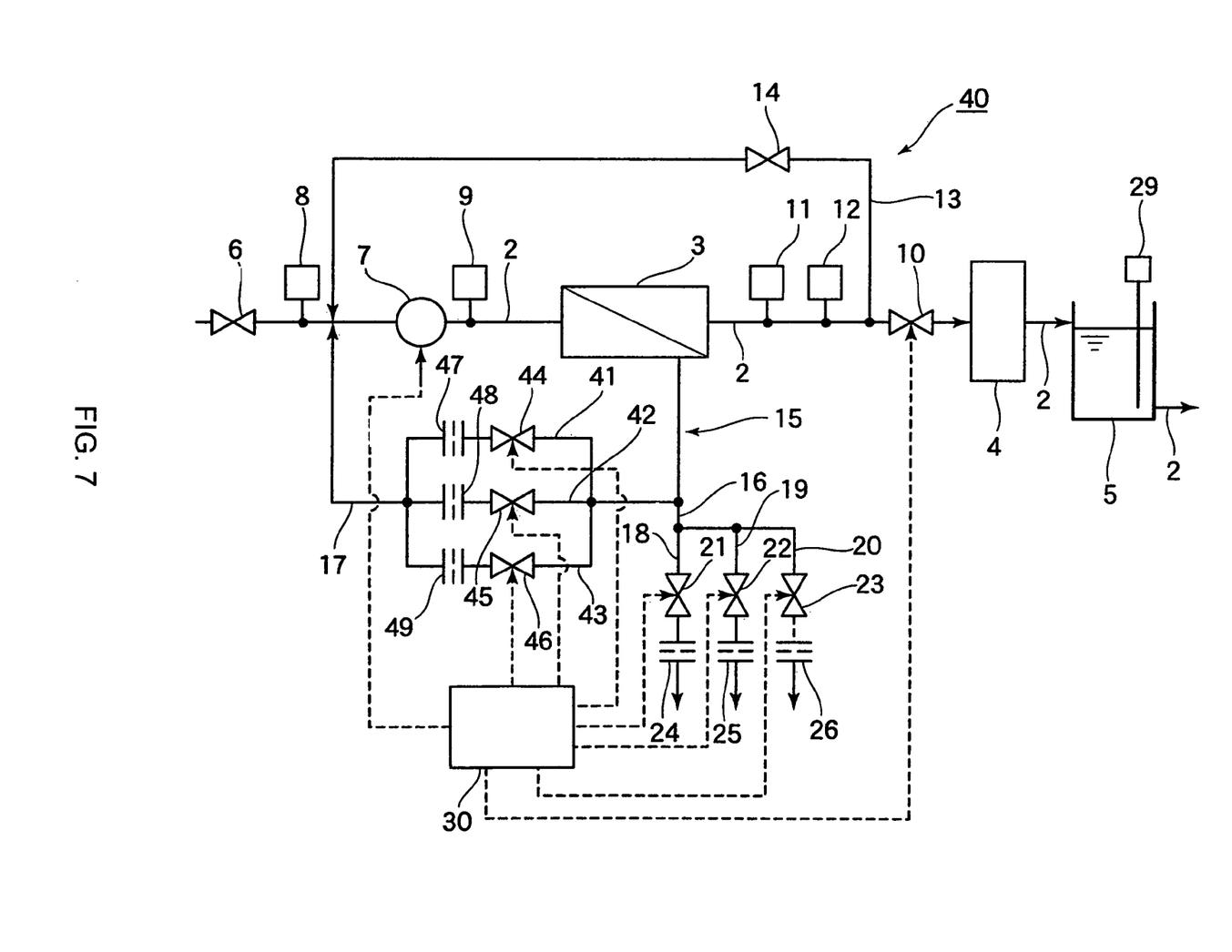
FIG. 7 is a schematic explanatory view illustrating the construction of a membrane filtration system according to a second embodiment of the present invention.

Next, a second embodiment of the present invention will be described with reference to FIG. 7. In FIG. 7, the same components as those of the membrane filtration system 1 of the first embodiment are indicated by the same reference numerals, and a detailed description thereof will be omitted.

In a membrane filtration system 40 shown in FIG. 7, the concentrate return line 17 branches off into a first concentrate return line 41, a second concentrate return line 42, and a third concentrate return line 43, and the concentrate return lines 41, 42, and 43 are provided with a fourth valve 44, a fifth valve 45, and a sixth valve 46 as return flow rate adjusting portion, respectively. Further, the concentrate return lines 41, 42, and 43 are provided with, on the downstream side of the valves 44, 45, and 46, a fourth constant flow rate valve 47, a fifth constant flow rate valve 48, and a sixth constant flow rate valve 49, respectively.

The valves 44, 45, and 46 are controlled by the control portion 30. Further, the control portion 30 controls the valves 44, 45, and 46 according to the flow rate of the product water from the filtering membrane portion 3, whereby the return flow rate of the concentrate is adjusted.

A method of operating the membrane filtration system 40 will be described. It should be noted that the description will center on the difference between this method and the method of operating the membrane filtration system 1 of the first embodiment.

In this embodiment also, the control portion 30 performs the constant flow rate control as described with reference to the first embodiment. Apart from this normal operation, the control portion performs an amount reduction operation in which the flow rate of the product water is reduced with a predetermined timing. The predetermined timing with which the amount reduction operation is to be performed is, for example, when the detection value of the temperature sensor 12 is reduced to a predetermined value. This reduction amount operation is conducted in order to efficiently effect the filtration by the filtering membrane portion 3 and the degassing by the degassing membrane portion 4 according to changes in the feed water temperature (for detail, see JP 2005-279459 A).

When transition of the operating condition to the reduction amount operation is effected, the control portion 30 appropriately sets the opening conditions of the drain valves 21, 22, and 23 and the valves 44, 45, and 46 such that the proportion of the concentrate flow rate with respect to the flow rate of the product water becomes a fixed proportion, reducing the drain flow rate and the return flow rate of the concentrate as the flow rate of the product water decreases.

When, during the reduction amount operation, the detection value of the temperature sensor 12 becomes larger than the predetermined value, the control portion 30 restores the operating condition to the constant flow rate control. In this case, the control portion 30 appropriately sets the opening conditions of the drain valves 21, 22, and 23 and the valves 44, 45, and 46 such that the proportion of the concentrate flow rate with respect to the flow rate of the product water becomes a fixed proportion, increasing the drain flow rate and the return flow rate of the concentrate as the flow rate of the product water increases, and restoring the drain flow rate and the return flow rate to those during normal operation.

According to the membrane filtration system 40, when the flow rate of the product water is reduced, the drain flow rate and the return flow rate of the concentrate are reduced, whereby it is possible to maintain the proportion of the concentrate flow rate with respect to the flow rate of the product water. As a result, the concentrate flow rate does not increase to a degree more than necessary with respect to the flow rate of the product water, and it is possible to prevent a wasteful power consumption in the feed pump 7. Further, when the flow rate of the product water increases, the drain flow rate and the return flow rate of the concentrate increases, whereby it is possible to maintain the proportion of the concentrate flow rate with respect to the flow rate of the product water. As a result, there is no fear of the concentrate flow rate being reduced with respect to the flow rate of the product water to cause a reduction in flow velocity at the surface of the reverse osmosis membrane, making it possible to prevent clogging in the reverse osmosis membrane due to fouling.

It goes without saying that the above-mentioned embodiments of the present invention allow various modifications without departing from the gist of the invention.

What is claimed is:

1. A membrane filtration system comprising:
a filtering membrane portion having a reverse osmosis membrane for removing impurities in feed water;
a water supply line connected to a primary side inlet port of the filtering membrane portion;
a feed pump provided in the water supply line;
an inverter controlling an operation frequency of the feed pump;
a permeate line connected to a secondary side port of the filtering membrane portion;
a flow rate sensor provided in the permeate line;
a concentrate line connected to a primary side outlet port of the filtering membrane portion;
one or more drain lines branched off from the concentrate line for draining a part of concentrate from the filtering membrane portion to an exterior of a system;
one or more drain valves provided in each of said drain lines;
a concentrate return line branched off from the concentrate line for returning a remainder of the concentrate from the filtering membrane portion to the water supply line on an upstream side of the feed pump;
a proportional control valve provided in the concentrate return line for adjusting a return flow rate of the concentrate;
a temperature sensor provided either in the water supply line or in the permeate line; and
a control portion controlling an opening/closing of the drain valves and an opening of the proportional control valve based on a detection value of the temperature sensor together with outputting a flow rate signal to the inverter based on a detection value of the flow rate sensor,
(i) wherein said control portion controls a rotational speed of the feed pump with the use of proportional-integral-differential (PID) control function of the inverter so that said detection value of the flow rate sensor attains a constant target value,
(ii) wherein said control portion changes a water recovery rate by controlling the number of the opened drain valves in response to said detection value of the temperature sensor so that no impurities concentration in excess of the solubility of impurities occurs in said concentrate,
(iii) wherein said control portion decreases the return flow rate so as to maintain the concentrate flow rate of the concentrate line at the set value by decreasing the opening of the proportional control valve when the water recovery rate decreases, and
(iv) wherein said control portion increases the return flow rate so as to maintain the concentrate flow rate of the concentrate line at the set value by increasing the opening of the proportional control valve when the water recovery rate increases.

2. A membrane filtration system comprising:
a filtering membrane portion having a reverse osmosis membrane for removing impurities in feed water;
a water supply line connected to a primary side inlet port of the filtering membrane portion;
a feed pump provided in the water supply line;

an inverter controlling an operation frequency of the feed pump;

a permeate line connected to a secondary side port of the filtering membrane portion;

a flow rate sensor provided in the permeate line;

a concentrate line connected to a primary side outlet port of the filtering membrane portion;

one or more drain lines branched off from the concentrate line for draining a part of concentrate from the filtering membrane portion to an exterior of a system;

one or more drain valves provided in each of said drain lines;

a concentrate return line branched off from the concentrate line for returning a remainder of the concentrate from the filtering membrane portion to the water supply line on an upstream side of the feed pump;

a proportional control valve provided in the concentrate return line for adjusting a return flow rate of the concentrate;

a water quality sensor provided either in the water supply line or in the permeate line; and a control portion controlling an opening/closing of the drain valves and an opening of the proportional control valve based on a detection value of the water quality sensor together with outputting a flow rate signal to the inverter based on a detection value of the flow rate sensor, (i) wherein said control portion controls a rotational speed of the feed pump with the use of proportional-integral-differential (PID) control function of the inverter so that said detection value of the flow rate sensor attains a constant target value, (ii) wherein said control portion changes a water recovery rate by controlling the number of the opened drain valves in response to said detection value of the water quality sensor so that no impurities concentration in excess of the solubility of impurities occurs in said concentrate, (iii) wherein said control portion decreases the return flow rate so as to maintain the concentrate flow rate of the concentrate line at the set value by decreasing the opening of the proportional control valve when the water recovery rate decreases, and (iv) wherein said control portion increases the return flow rate so as to maintain the concentrate flow rate of the concentrate line at the set value by increasing the opening of the proportional control valve when the water recovery rate increases.

* * * * *